No. 717,120. Patented Dec. 30, 1902.
J. M. REID.
POULTRY ROOST.
(Application filed Apr. 3, 1902.)
(No Model.) 2 Sheets—Sheet I.
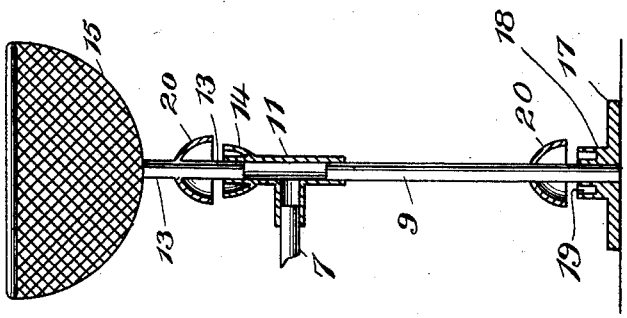
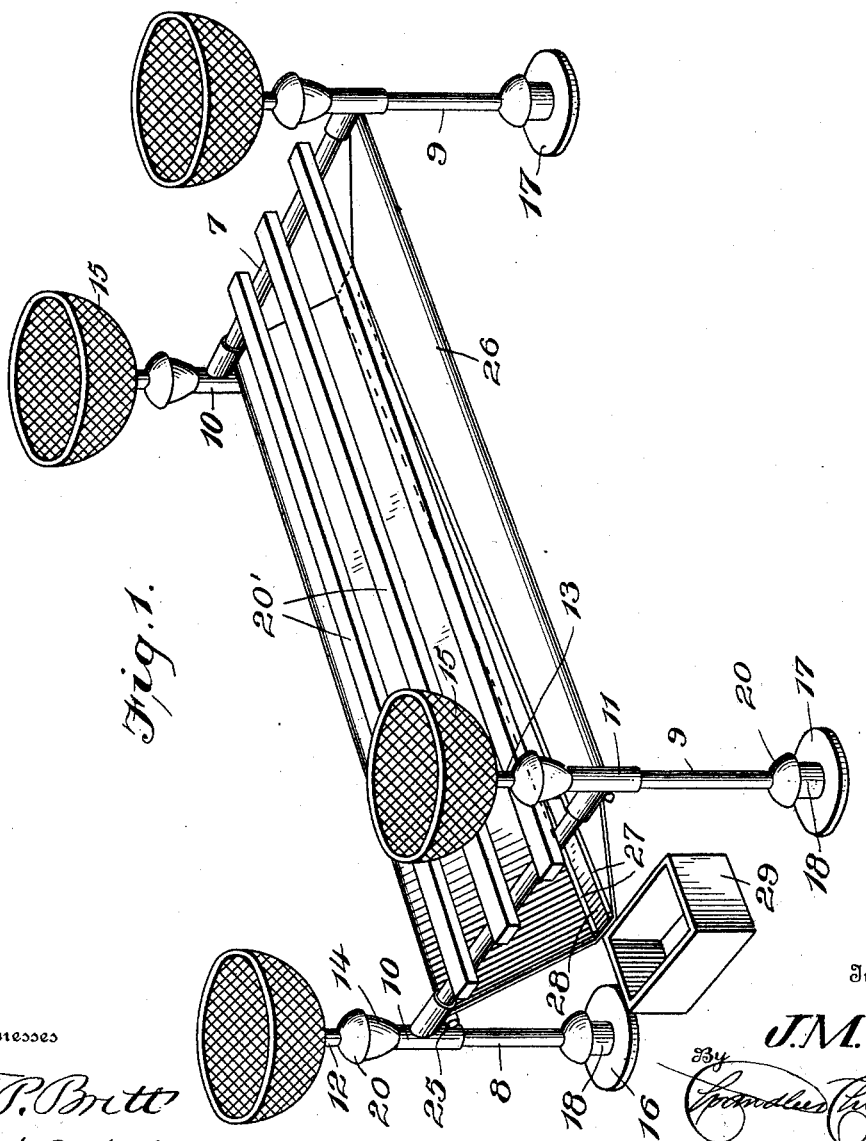
Witnesses
T. P. Britt
J. E. Dimmick
Inventor
J. M. Reid
By
Chandlee Chandlee
Attorneys

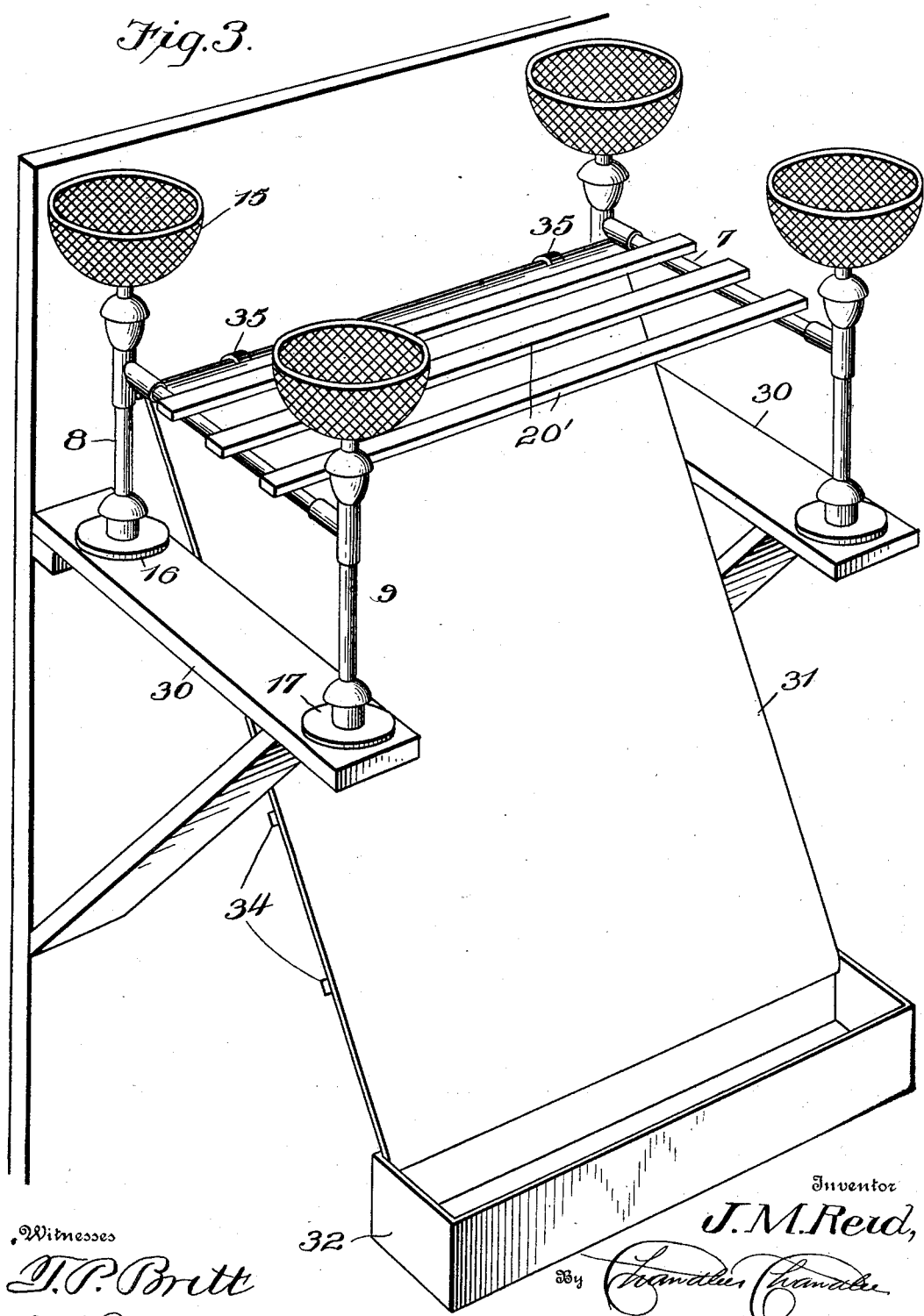

UNITED STATES PATENT OFFICE.

JESSE M. REID, OF POMEROY, WASHINGTON.

POULTRY-ROOST.

SPECIFICATION forming part of Letters Patent No. 717,120, dated December 30, 1902.

Application filed April 3, 1902. Serial No. 101,189. (No model.)

*To all whom it may concern:*

Be it known that I, JESSE M. REID, a citizen of the United States, residing at Pomeroy, in the county of Garfield, State of Washington, have invented certain new and useful Improvements in Poultry-Roosts; and I do hereby declare the following to be a full, clear, and exact description of the invention, such as will enable others skilled in the art to which it appertains to make and use the same.

This invention relates to poultry-roosts; and it has for its object to provide a construction which will not harbor vermin, which may be easily cleaned, and which will prevent vermin from crawling thereonto.

A further object of the invention is to provide, in connection with the roost, nests so arranged and constructed as to prevent passage of vermin between the nest and roost, the entire arrangement being such as to permit of access of a person to all sides of the roost, with the nests, with the well-known advantages incident thereto.

Other objects and advantages of the invention will be understood from the following description.

In the drawings forming a portion of this specification, and in which like numerals of reference indicate similar parts in the several views, Figure 1 is a perspective view of the roost. Fig. 2 is a vertical section of the roost through one end portion thereof, including a nest. Fig. 3 is a perspective view showing the roost and nests attached to the wall of a coop.

Referring now to the drawings, the present roost consists of the two end portions and each of which includes a horizontal member 7, having depending end portions 8 and 9, said horizontal member and end portions being formed of three sections of pipe connected by means of the T connections 10 and 11, the heads of the connections being disposed vertical and having nipples 12 and 13 engaged with the upper ends thereof, and formed upon the upper end portions of the heads of the T connections are the outwardly and upwardly projecting flanges 14, forming cups surrounding the end portions and which are adapted to receive oil or other fluid to prevent passage of vermin from one side to the other of the cups.

Attached to each of the nipples 12 and 13 is a nest 15, as shown, and which is held by the nipple in upright position.

To hold the end portions of the roost in vertical positions, the portions 8 and 9, which are nipples, are engaged in floor-plates 16 and 17, and in the raised portions 18 of which plates are formed the grooves 19, forming cups surrounding the nipples and prevent passage of vermin from the plates to the nipples when said cups are filled with oil or other suitable liquid. As above stated, there are two of these end portions provided, and, as shown, they are arranged parallel, and disposed upon their horizontal portions are the slats 20', so positioned that they touch only the horizontal supports, so that passage of vermin to the slats from the walls of the building or other exterior object is prevented.

To prevent foreign matter from dropping into the oil-cups, covers 20 are provided therefor, each consisting of a disk secured to the roost-support or nest-support, respectively, just above the cup and spaced only slightly from the upper edge of the cup, the disks being slightly dished, with their convex faces disposed upwardly and their peripheries projecting beyond the outer side faces of the cups, as shown.

It is found desirable to prevent droppings from the fowls from falling upon the floor or ground beneath the roosts, and for this purpose each roost is provided with rods 25, which are secured against the inner faces of the upper ends of the uprights of the roost, and attached to these rods at its side edges is a truncated triangular sheet 26 of oiled fabric or other suitable material, to which the droppings will not stick. Longitudinally of the sheet 26 and at the center thereof are secured parallel slats 27, between which is a flat gutter 28, inclined from one end to the other of the device owing to the convergence of the side edges of the sheet, and at the lower end of the gutter and below the sheet is disposed a receptacle 29, into which the droppings pass or may be brushed.

In Fig. 3 of the drawings there is shown the roost applied to the side of a coop. In this case the uprights of the roost are mounted upon brackets 30, secured to the wall of the coop. In this case is used also a sheet 31 of oiled or otherwise-treated fabric to catch and direct the droppings to a receptacle 32. The sheet in this instance is shown as provided with slats 34 to hold it stiff and with clips 35 for engagement with the crossbars of the roost to hold the sheet in active position.

In practice modifications of the specific constructions shown may be made and any suitable materials and proportions may be used for the various parts without departing from the spirit of the invention.

What is claimed is—

1. The combination with a poultry-roost comprising end supports and slats thereon, of a chute consisting of a single section of fabric attached at its corners to the ends of the supports and having parallel-spaced slats secured longitudinally thereof between its side edges to hold the fabric under tension, said fabric being narrower at one end than the other whereby the fabric between the slats is inclined.

2. The combination with a poultry-roost comprising end supports and slats thereon, of a chute consisting of a sheet of fabric attached to the end supports and extending diagonally beneath the slats, and slats secured transversely of the fabric to stiffen the latter.

3. A poultry roost and nest comprising end supports, each including a horizontal portion and terminal depending portions comprising T connections disposed with their heads vertical and having cups encircling their upper ends, nests attached to the T connections above the cups, slats disposed upon the horizontal portions, supports connected to the lower ends of the heads of the T connections and cups encircling the supports below said horizontal portions.

4. A poultry roost and nest comprising end supports each including a horizontal member having T connections at its ends having their heads disposed vertical, nipples engaged with the lower ends of the heads of the T connections, floor-plates in which the lower ends of the nipples are engaged and having cups surrounding their respective nipples, the upper ends of the heads of the T connections having cups encircling them, and nests engaged with the T connections above the cups, the supports having slats disposed thereon.

5. The combination with a poultry roost and nest, of means for catching and directing droppings, said means including a fabric having means for attaching it to the roost and provided with longitudinal slats and an intermediate gutter.

In testimony whereof I affix my signature in presence of two witnesses.

JESSE M. REID.

Witnesses:
   G. C. START,
   A. E. DICKSON.